(12) United States Patent
Murata (10) Patent No.: US 7,240,776 B2
(45) Date of Patent: Jul. 10, 2007

(54) BOTTOM VALVE APPARATUS OF HYDRAULIC SHOCK ABSORBER

(75) Inventor: Takeshi Murata, Saitama (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/636,080

(22) Filed: Aug. 7, 2003

(65) Prior Publication Data
US 2004/0129517 A1    Jul. 8, 2004

(30) Foreign Application Priority Data
Jan. 8, 2003    (JP)    ............................. 2003-002638

(51) Int. Cl.
*F16F 9/348*    (2006.01)
*F16F 9/512*    (2006.01)

(52) U.S. Cl. ............................................... 188/322.14

(58) Field of Classification Search ... 188/280–322.22; 267/170, 174, 179
See application file for complete search history.

(56) References Cited

U.S. PATENT DOCUMENTS

| 3,151,855 | A | * | 10/1964 | Joseph ........................ 267/287 |
| 3,684,179 | A | * | 8/1972 | Fischer et al. ............... 239/203 |
| 3,761,189 | A | * | 9/1973 | Suzuki ........................ 403/320 |
| 4,390,084 | A | * | 6/1983 | Haraikawa et al. ........ 188/71.7 |
| 6,290,035 | B1 | | 9/2001 | Kazmirski |
| 6,666,785 | B1 | * | 12/2003 | Namie et al. ............... 474/109 |

FOREIGN PATENT DOCUMENTS

| EP | 1113186 | 7/2001 |
| EP | 1148268 | 10/2001 |
| JP | 222150 | 3/1991 |

* cited by examiner

*Primary Examiner*—Christopher P. Schwartz
(74) *Attorney, Agent, or Firm*—Orum & Roth LLC (57) ABSTRACT

In a bottom valve apparatus in which a flow passage is formed in a bottom piece, a check valve opening and closing the flow passage is provided in one face side of the bottom piece, and a coil spring urging the check valve is fastened by a bolt and a nut which are provided in the bottom piece, a thread direction of the nut or the bolt fastening the coil spring is set to an opposite direction to a winding direction of the coil spring.

18 Claims, 6 Drawing Sheets

BOTTOM VALVE APPARATUS OF HYDRAULIC SHOCK ABSORBER

BACKGROUND OF THE INVENTION

1. Field of the Invention

The present invention relates to a bottom valve apparatus of a hydraulic shock absorber.

2. Description of the Related Art

Figure 6A:
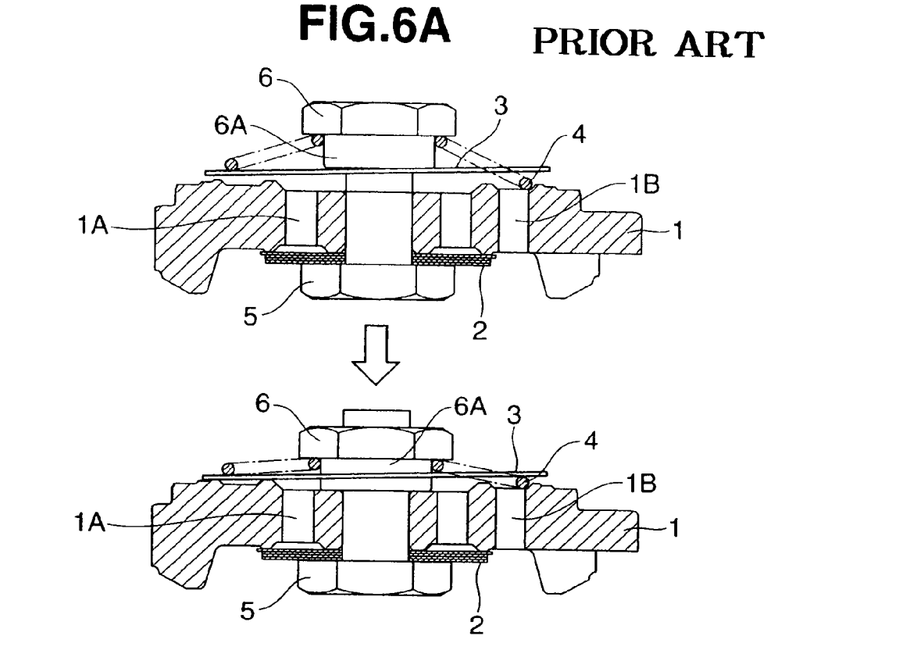
Figure 6B:
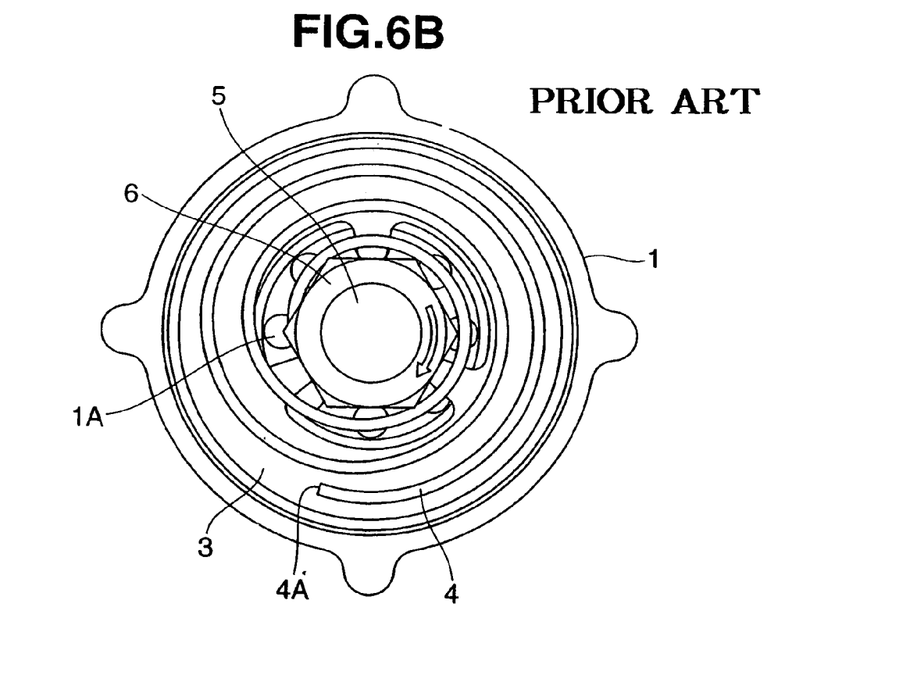
Figure 7:
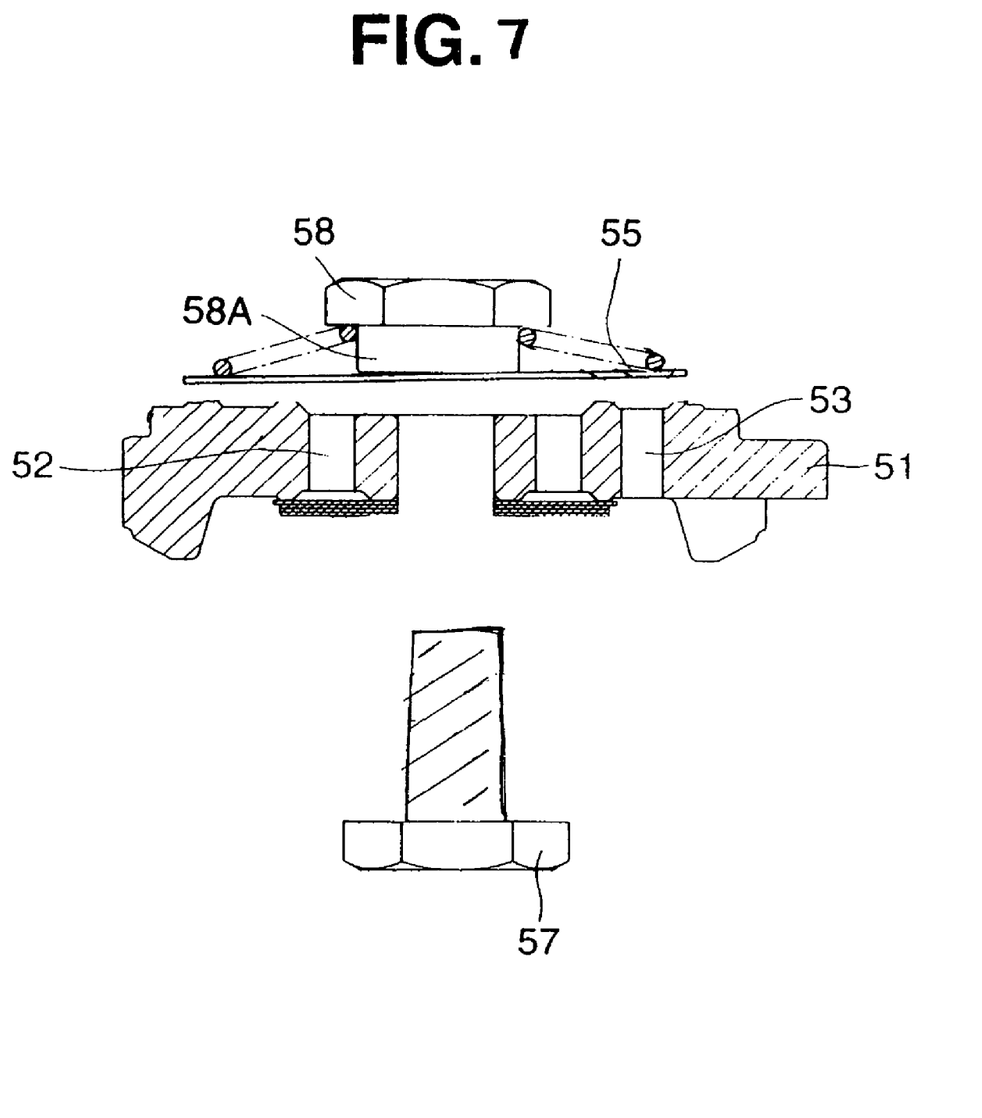
FIG. 7 is an expanded cross sectional view of a bottom valve apparatus.

A bottom valve apparatus of a hydraulic shock absorber may be structured, as described in Japanese Utility Model Application Laid-open No. 3-22150 (patent publication 1), such that a push side flow passage 1A and a pull side flow passage 1B are formed in a bottom piece 1. A push side damping valve 2 opening and closing the push side flow passage 1A and a check valve 3 opening and closing the pull side flow passage 1B are respectively provided in a lower face side and an upper face side of the bottom piece 1, and a coil spring 4 urging the check valve 3 is fastened by a bolt 5 and a nut 6 which are provided in the bottom piece 1 (FIGS. 6A and 6B).

However, when the bottom valve apparatus is assembled, there is often a problem in that a leading end portion of the coil spring 4 is caught in the check valve 3. The bolt 5 in which the damping valve 2 is assembled is inserted from a lower surface side of the bottom piece 1, the check valve 3 and the coil spring 4 are arranged in the vicinity of a protruding end of the bolt 5 protruding to an upper face side of the bottom piece 1, and the nut 6 is screwed with the protruding end of the bolt 5. The check valve 3 and the coil spring 4 are centered by a centering guide 6A of the nut 6 so as to be fastened. However, in this case, there may be a situation that an end portion 4A of the coil spring 4 rotating together with a rotation of the nut 6 in a contacting side with the check valve 3 gets under the check valve 3 so as to be caught in a position between the bottom piece 1 and the check valve 3, during the centering of the check valve 3 (FIG. 6A).

As a result of a study carried out by the inventor of the present invention, it has been found that since a thread direction of the nut 6 (a rotating direction for moving the nut 6 in a fastening direction) is a right handed thread, and a winding direction of the coil spring 4 (a winding direction for moving the coil spring 4 in a direction apart from the nut 6) is also a right handed coil (FIG. 6B), the end portion 4A of the coil spring 4 in the contacting side with the check valve 3 moves in a direction which the check valve 3 is caught when the coil spring 4 rotates together with the rotation of the nut 6.

SUMMARY OF THE INVENTION

An object of the present invention is to prevent a coil spring from being caught in a check valve when a bottom valve apparatus is assembled.

The present invention relates to a bottom valve apparatus of a hydraulic shock absorber having: a bottom piece, a flow passage formed in the bottom piece, a check valve opening and closing the flow passage and provided in one face side of the bottom piece, and a coil spring urging the check valve.

The coil spring is fastened by a bolt and a nut which are provided in the bottom piece.

A thread direction of the nut or the bolt fastening the coil spring is set to a direction opposite to a winding direction of the coil spring.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 4A and 4B show a bottom valve apparatus, in which FIG. 4A is a cross sectional view and FIG. 4B is a plan view;

FIGS. 6A and 6B show a conventional bottom valve apparatus, in which FIG. 6A is a cross sectional view and FIG. 6B is a plan view.

DESCRIPTION OF THE PREFERRED EMBODIMENTS

Figure 1:
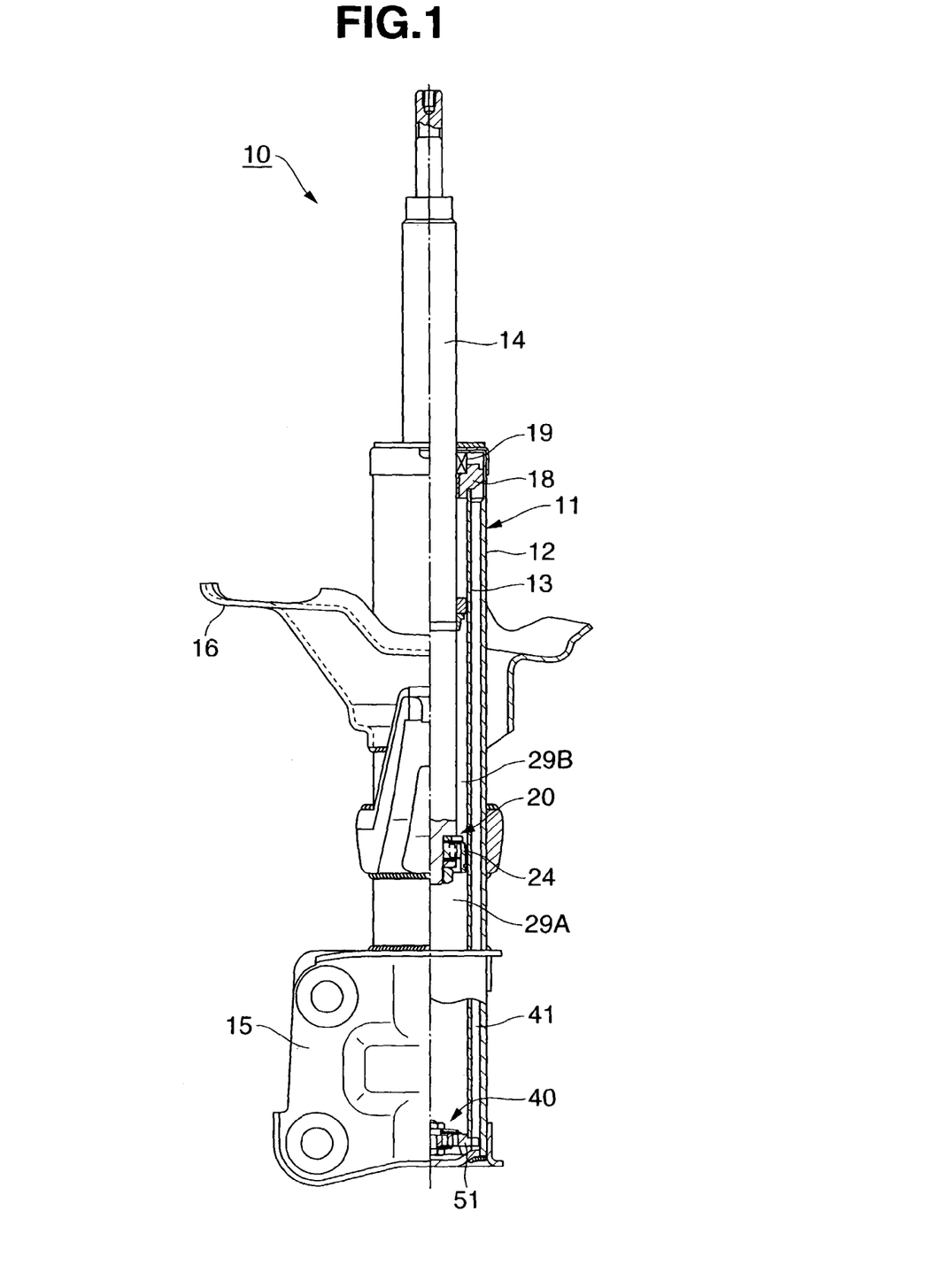
FIG. 1 is a half cross sectional view showing a hydraulic shock absorber.

FIG. 1 shows a twin tube type hydraulic shock absorber 10 constituting a strut type suspension. In the hydraulic shock absorber 10, a damper tube 11 is formed as a double tube comprising an outer tube 12 and an inner tube 13. The hydraulic shock absorber 10 constructs a suspension apparatus of a vehicle by inserting the piston rod 14 to the inner tube 13 built in the outer tube 12, connecting a vehicle body side mounting bracket (not shown) to an upper end portion of the piston rod 14, and connecting a lower end portion of the outer tube 12 to a wheel side by a knuckle bracket 15.

The hydraulic shock absorber 10 is structured such that a suspension spring (not shown) is interposed between a lower spring seat 16 disposed in an outer periphery of the outer tube 12 and an upper spring seat (not shown) supported by a mounting bracket in an upper end portion of the piston rod 14, thereby absorbing impact forces generated when the vehicle travels.

The hydraulic shock absorber 10 is structured such that when the inner tube 13 is disposed in the outer tube 12 in an upright manner, the lower end portion of the inner tube 13 is centered and supported to the bottom portion of the outer tube 12 via a bottom piece 51, and the upper end portion of the inner tube 13 is centered and supported to an upper end opening portion of the outer tube 12 via a rod guide 18. Further, the hydraulic shock absorber 10 is provided with a shaft seal portion 19 such as an oil seal or the like through which the piston rod 14 is extended, in an upper portion of the rod guide 18. The shaft seal portion 19, the rod guide 18, the inner tube 13 and the bottom piece 51 may be clamped between the caulking portion of the upper end in the outer tube 12 and the bottom portion of the outer tube 12.

The hydraulic shock absorber 10 has a piston valve apparatus 20 which may be an extension side damping force generating apparatus and a bottom valve apparatus 40 which may be a compression side damping force generating apparatus. The hydraulic shock absorber 10 controls a stretching vibration of the damper tube 11 and the piston rod 14 caused by absorption of the impact force by the suspension spring.

Figure 2:
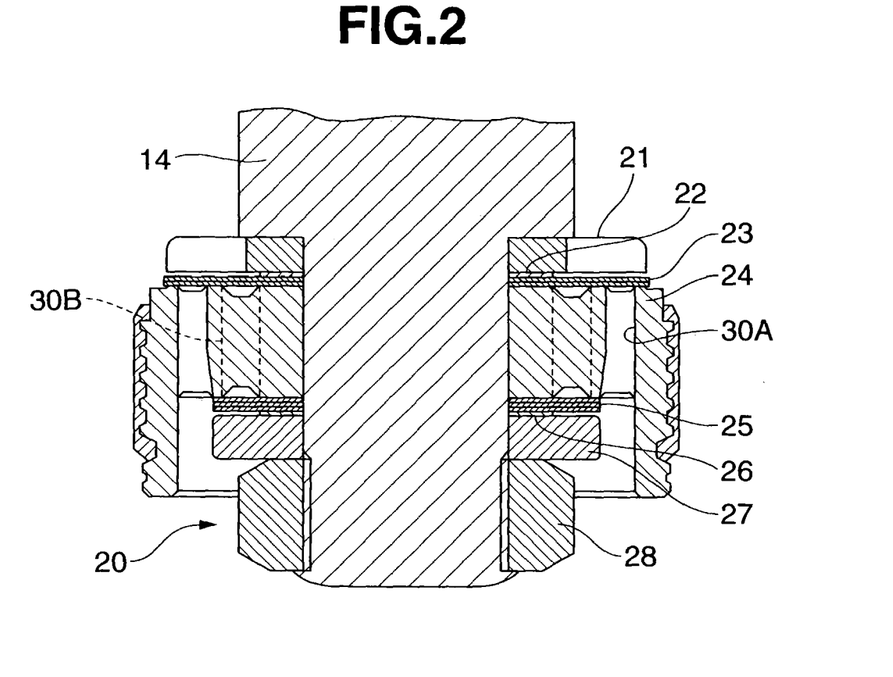
FIG. 2 is an enlarged cross sectional view showing a piston valve apparatus.

Piston Valve Apparatus 20:

The piston valve apparatus 20 is structured, as shown in FIG. 2, such that a valve stopper 21, a valve seat 22, a check valve 23, a piston 24, a disc valve 25, a valve seat 26 and a valve stopper 27 are attached to the piston rod 14, and are fixed by a nut 28. The piston 24 divides an inner portion of the inner tube 13 into a piston side damper chamber 29A and a rod side damper chamber 29B. The piston 24 forms a push side flow passage 30A and a pull side flow passage 30B communicating both the damper chambers 29A and 29B, is provided with the check valve 23 in the push side flow passage 30A, and is provided with the disc valve 25 in the pull side flow passage 30B.

When the hydraulic shock absorber 10 is compressed, oil in the piston side damper chamber 29A passes through the push side flow passage 30A so as to flexibly deform and open the check valve 23, and oil is introduced to the rod side damper chamber 29B. When the hydraulic shock absorber 10 is extended, oil in the rod side damper chamber 29B passes through the pull side flow passage 30B so as to flexibly deform and open the disc valve 25, flowing to the piston side damper chamber 29A, thereby generating an extension side damping force.

Figure 3:
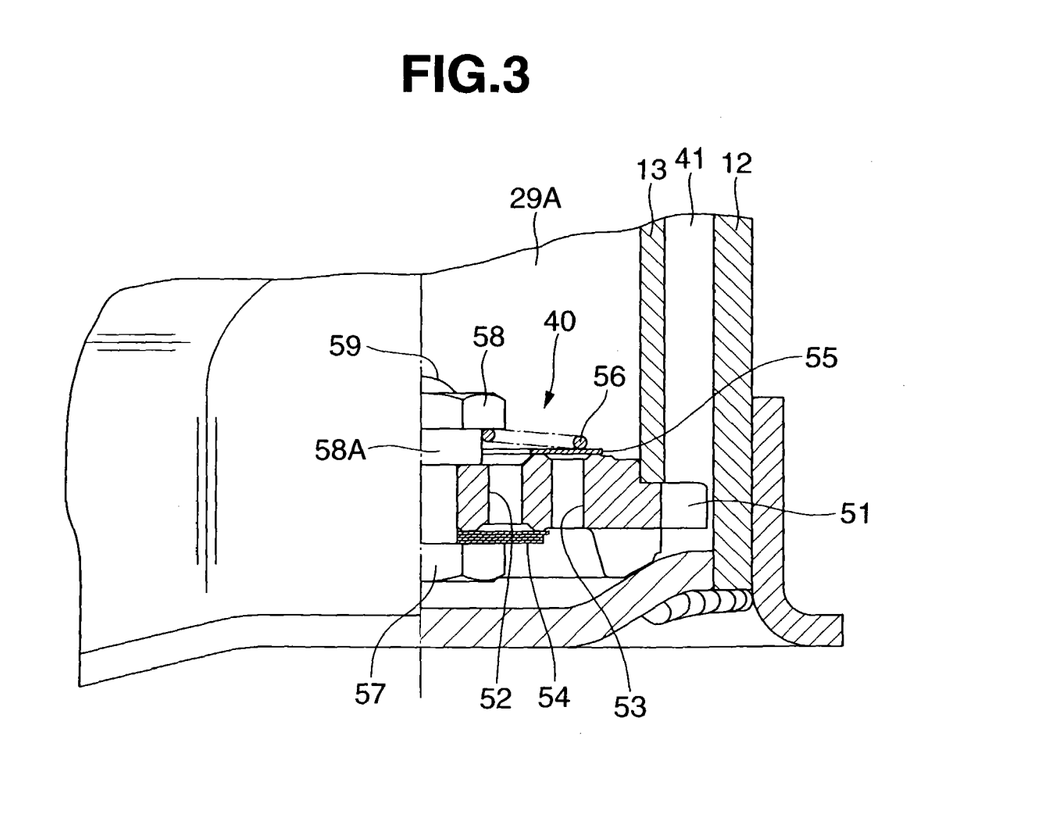
FIG. 3 is an enlarged cross sectional view showing a bottom valve apparatus.

Bottom Valve Apparatus 40:

The hydraulic shock absorber 10 is structured such that a reservoir chamber 41 is formed between the outer tube 12 and the inner tube 13, and an inner portion of the reservoir chamber 41 is sectioned by an oil chamber and a gas chamber. The bottom valve apparatus 40 divides the piston side damper chamber 29A and the reservoir chamber 41 by the bottom piece 51 provided between the bottom portion of the outer tube 12 and the lower end portion of the inner tube 13, as shown in FIG. 3.

Figure 4A:
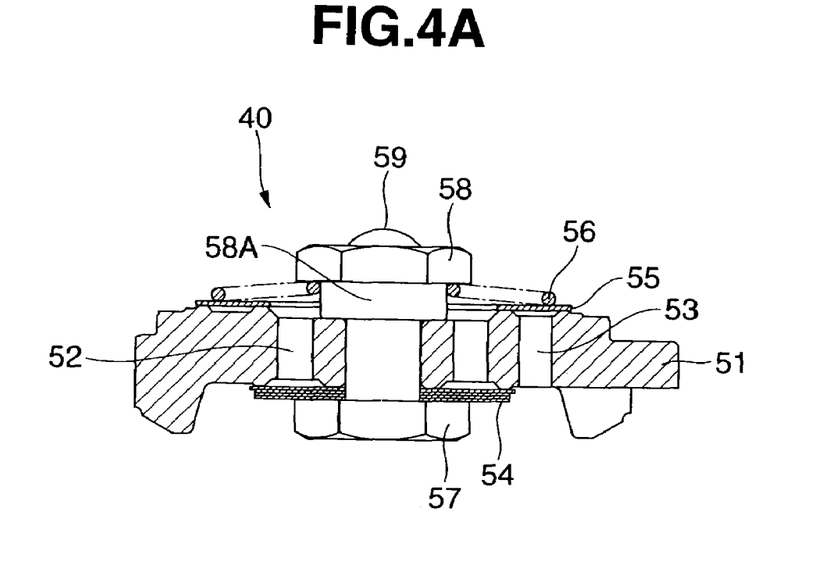
Figure 4B:
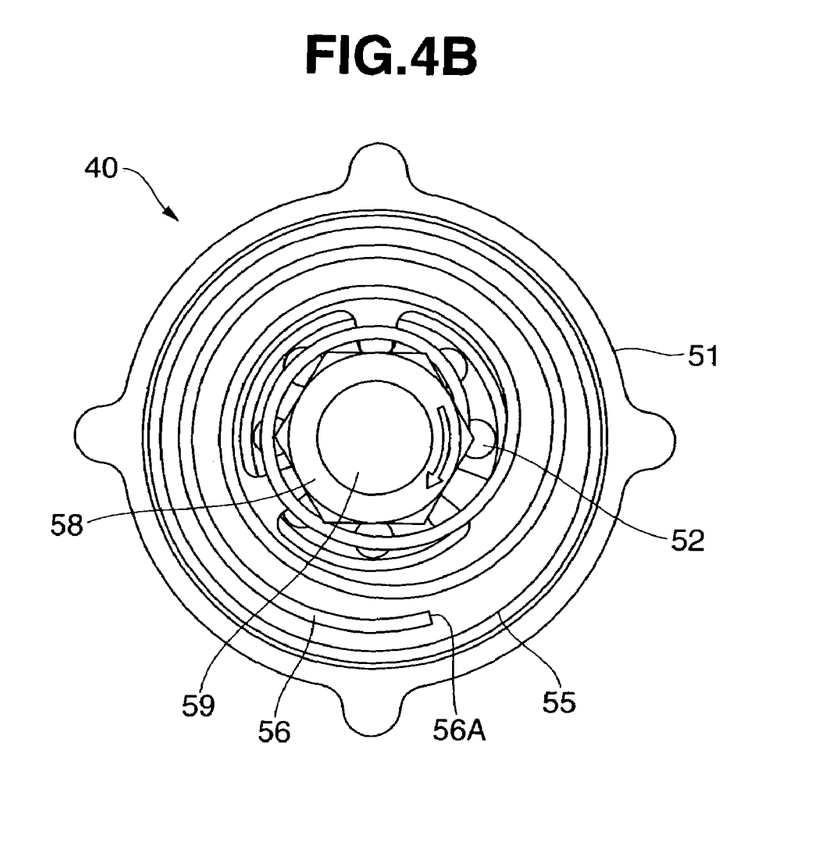

In the bottom valve apparatus 40, as shown in FIG. 4, a push side flow passage 52 and a pull side flow passage 53 which communicate the piston side damper chamber 29A with the reservoir chamber 41 are formed in the bottom piece 51 corresponding to a molded body formed by filling a sintered powder in a metal mold. The bottom valve apparatus 40 is provided with a damping valve 54 opening and closing the push side flow passage 52 in a lower face side of the bottom piece 51, and is provided with a check valve 55 opening and closing the pull side flow passage 53 and a coil spring 56 urging the check valve 55 in an upper face side of the bottom piece 51. The bottom valve apparatus 40 is structured such that a bolt 57 passing through the damping valve 54 is inserted from the lower face side of the bottom piece 51. The check valve 55 and the coil spring 56 are arranged in the vicinity of the protruding end of the bolt 57 protruding to the upper face side of the bottom piece 51. A nut 58 is engaged with the protruding end of the bolt 57, and the check valve 55 and the coil spring 56 are centered and fastened by the nut 58. The nut 58 is provided with a centering guide 58A for the check valve 55 and the coil spring 56 along a side brought into contact with the upper face of the bottom piece 51 (FIG. 4A). An end portion of the bolt 57 protruding to an upper face of the nut 58 is formed as a caulked portion 59 so as to prevent the nut 58 from rotating.

When the hydraulic shock absorber 10 is compressed, oil in the piston side damper chamber 29A passes through the push side flow passage 52 so as to flexibly deform and open the disc valve 54. Oil flows into the reservoir chamber 41, and generates a compression side damping force. When the hydraulic shock absorber 10 is extended, oil in the reservoir chamber 41 passes through the pull side flow passage 53 so as to lift up and open the check valve 55, and is introduced to the piston side damper chamber 29A.

In this case, in the bottom valve apparatus 40, a thread direction of the nut 58 fastening the coil spring 56 (a rotating direction for moving the nut 58 in a fastening direction) is set to an opposite direction to a winding direction of the coil spring 56 (a winding direction for moving an element wire of the coil spring 56 in a direction apart from a side of the nut 58) (FIG. 4B). In the present embodiment, the thread direction of the nut 58 is set to a right handed thread and the winding direction of the coil spring 56 is set to a left handed coil. In the case that the thread direction of the nut 58 is set to a left handed thread, the winding direction of the coil spring 56 is set to a right handed coil.

In one embodiment, the coil spring 56 in accordance with the present embodiment is formed in a spiral shape, and is expanded spirally in a moving direction apart from the nut 58, and an end portion in an outer peripheral side is in contact with the surface of the check valve 55. In one embodiment, the coil spring 56 in accordance with the present invention may be formed in a straight shape, such as a complete cylindrical shape.

In accordance with the present embodiment, the following operations and effects can be obtained.

(1) The thread direction of the nut 58 fastening the coil spring 56 is set to an opposite direction to the winding direction of the coil spring 56. Accordingly, when the coil spring 56 rotates together with the rotation of the nut 58, the end portion 56A of the coil spring 56 in side contact with the check valve 55 slips on the check valve 55 in an opposite direction to the winding direction of the coil spring 56. The coil spring 56 does not get under the check valve 55, and does not get caught in the portion between the bottom piece 51 and the check valve 55.

(2) Since the nut 58 is provided with the centering guide 58A for the check valve 55 and the coil spring 56, the strength of the bottom piece 51, which is formed, for example, by a sintered alloy is not reduced, in comparison with the structure in which the centering guide is provided in the bottom piece.

In the embodiment where the bottom piece 51 is provided with the centering guide for the check valve 55 and the coil spring 56, the coil spring 56 does not get caught into the check valve 55. However, in the embodiment where the projection-shaped centering guide is formed in the sintered bottom piece 51, the strength of the projection portion is lowered, so that there is a risk that the projection is damaged and broken when fastening the bolt 57 and the nut 58. Further, in the case that a centering collar is added to the bottom piece 51, it causes an increase in the number of parts and an increase in the number of assembling man-hours required. Accordingly, this structure is not optimal.

Figure 5:
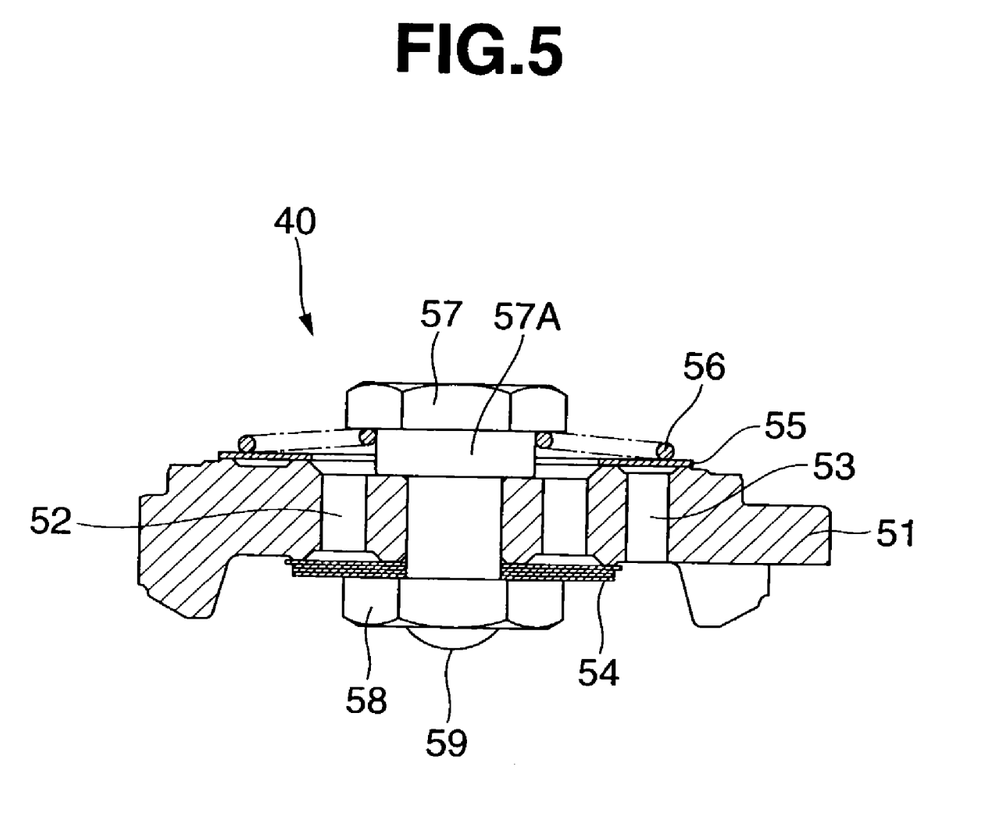
FIG. 5 is a cross sectional view showing another embodiment of the bottom valve apparatus.

A bottom valve apparatus 40 may be structured, as shown in FIG. 5, such that a check valve 55 and a coil spring 56 are arranged in the upper face side of a bottom piece 51. A bolt 57 passes through the check valve 55 and the coil spring 56 is inserted from the upper face side of the bottom piece 51. A nut 58 is screwed with the protruding end of the bolt 57 protruding to the lower face side of the bottom piece 51, and the coil spring 56 is centered and fastened by the bolt 57. The end portion of the bolt 57 protruding to the lower face of the nut 58 is formed as a caulked portion 59 so as to prevent the nut 58 from rotating. The bolt 57 is provided with a centering guide 57A for the check valve 55 and the coil spring 56 in the side brought into contact with the upper face of the bottom piece 51.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

In accordance with the present invention, it is possible to prevent the coil spring from being caught in the check valve when assembling the bottom valve apparatus.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A bottom valve apparatus of a hydraulic shock absorber comprising:
   a bolt and nut provided with a guide element centering the coil spring and the check valve plate by the nut or the bolt;
   a bottom piece;
   a flow passage formed in the bottom piece;
   a check valve opening and closing the flow passage and being disposed in one face side of the bottom piece, the check valve being movable in response to fluid pressure;
   a coil spring urging the check valve;
   the coil spring and the check valve being exposed to hydraulic fluid during normal operation,
   the check valve being a relatively thin plate, which is movable during normal operation, having a sealing side and a coil spring side, the check valve being disposed between the coil spring and the bottom piece, the check valve having an area which would undesirably allow a leading end of the coil spring to move from the coil spring side to the sealing side upon rotation of the coil spring in a direction where the leading end of the coil spring is leading the rest of the spring during assembly;
   the coil spring being fastened by a bolt and a nut which are being disposed in the bottom piece;
   leading end portion of the coil spring being directly abutted to a coil spring side surface of the check valve, the coil spring imposing a force against the coil spring side surface tending to controllably oppose movement of the check valve away from a closed position;
   a thread direction of the nut or the bolt fastening the coil spring being set to an opposite direction to a winding direction of the coil spring;
   wherein, due to the opposite winding directions of the nut or bolt with respect to the spring, any movement imparted to the coil spring by the tightening action of the nut or bolt during assembly would be such that the leading end of the coil spring would trail the rest of the spring, thereby preventing the leading end of the coil spring from moving from the spring side to the sealing side of the check valve to prevent disrupting the sealing function of the sealing side of the check valve.

2. The bottom valve apparatus of a hydraulic shock absorber according to claim 1, wherein the nut of the bolt has a centering guide for the check valve and the coil spring.

3. The bottom valve apparatus of a hydraulic shock absorber according to claim 1, wherein the bolt is insertable from a lower face side of the bottom piece, the check valve and the coil spring are disposed in the vicinity of a protruding end of the bolt protruding to an upper face side of the bottom piece, the nut is screwed with the protruding end of the bolt, and the coil spring is centered and fastened by the nut.

4. The bottom valve apparatus of a hydraulic shock absorber according to claim 2, wherein the bolt is insertable from a lower face side of the bottom piece, the check valve and the coil spring are disposed in the vicinity of a protruding end of the bolt protruding to an upper face side of the bottom piece, the nut is screwed with the protruding end of the bolt, and the coil spring is centered and fastened by the nut.

5. The bottom valve apparatus of a hydraulic shock absorber according to claim 1, wherein the check valve and the coil spring are disposed in an upper face side of the bottom piece, the bolt passing through the check valve and the coil spring is insertable from an upper face side of the bottom piece, the nut is screwed with a protruding end of the bolt protruding to a lower face side of the bottom piece, and the coil spring is centered and fastened by the bolt.

6. The bottom valve apparatus of a hydraulic shock absorber according to claim 2, wherein the check valve and the coil spring are disposed in an upper face side of the bottom piece, the bolt passing through the check valve and the coil spring is insertable from an upper face side of the bottom piece, the nut is screwed with a protruding end of the bolt protruding to a lower face side of the bottom piece, and the coil spring is centered and fastened by the bolt.

7. The bottom valve apparatus of a hydraulic shock absorber according to claim 1, wherein the coil spring is substantially a spiral shape of increasing diameter, and an outer peripheral end portion of the coil spring is contactable with a surface of the check valve.

8. The bottom valve apparatus of a hydraulic shock absorber according to claim 2, wherein the coil spring is substantially a spiral shape of increasing diameter, and an outer peripheral end portion of the coil spring is contactable with a surface of the check valve.

9. The bottom valve apparatus of a hydraulic shock absorber according to claim 3, wherein the coil spring is substantially a spiral shape of increasing diameter, and an outer peripheral end portion of the coil spring is contactable with a surface of the check valve.

10. The bottom valve apparatus of a hydraulic shock absorber according to claim 4, wherein the coil spring is substantially a spiral shape of increasing diameter, and an outer peripheral end portion of the coil spring is contactable with a surface of the check valve.

11. The bottom valve apparatus of a hydraulic shock absorber according to claim 5, wherein the coil spring is substantially a spiral shape of increasing diameter, and an outer peripheral end portion of the coil spring is contactable with a surface of the check valve.

12. The bottom valve apparatus of a hydraulic shock absorber according to claim 6, wherein the coil spring is substantially a spiral shape of increasing diameter, and an outer peripheral end portion of the coil spring is contactable with a surface of the check valve.

13. The bottom valve apparatus of a hydraulic shock absorber according to claim 1, wherein the coil spring is substantially a complete cylindrical shape.

14. The bottom valve apparatus of a hydraulic shock absorber according to claim 2, wherein the coil spring is substantially a complete cylindrical shape.

15. The bottom valve apparatus of a hydraulic shock absorber according to claim 3, wherein the coil spring is substantially a complete cylindrical shape.

16. The bottom valve apparatus of a hydraulic shock absorber according to claim 4, wherein the coil spring is substantially a complete cylindrical shape.

17. The bottom valve apparatus of a hydraulic shock absorber according to claim 5, wherein the coil spring is substantially a complete cylindrical shape.

18. The bottom valve apparatus of a hydraulic shock absorber according to claim 6, wherein the coil spring is substantially a complete cylindrical shape.

* * * * *